Patented June 27, 1944

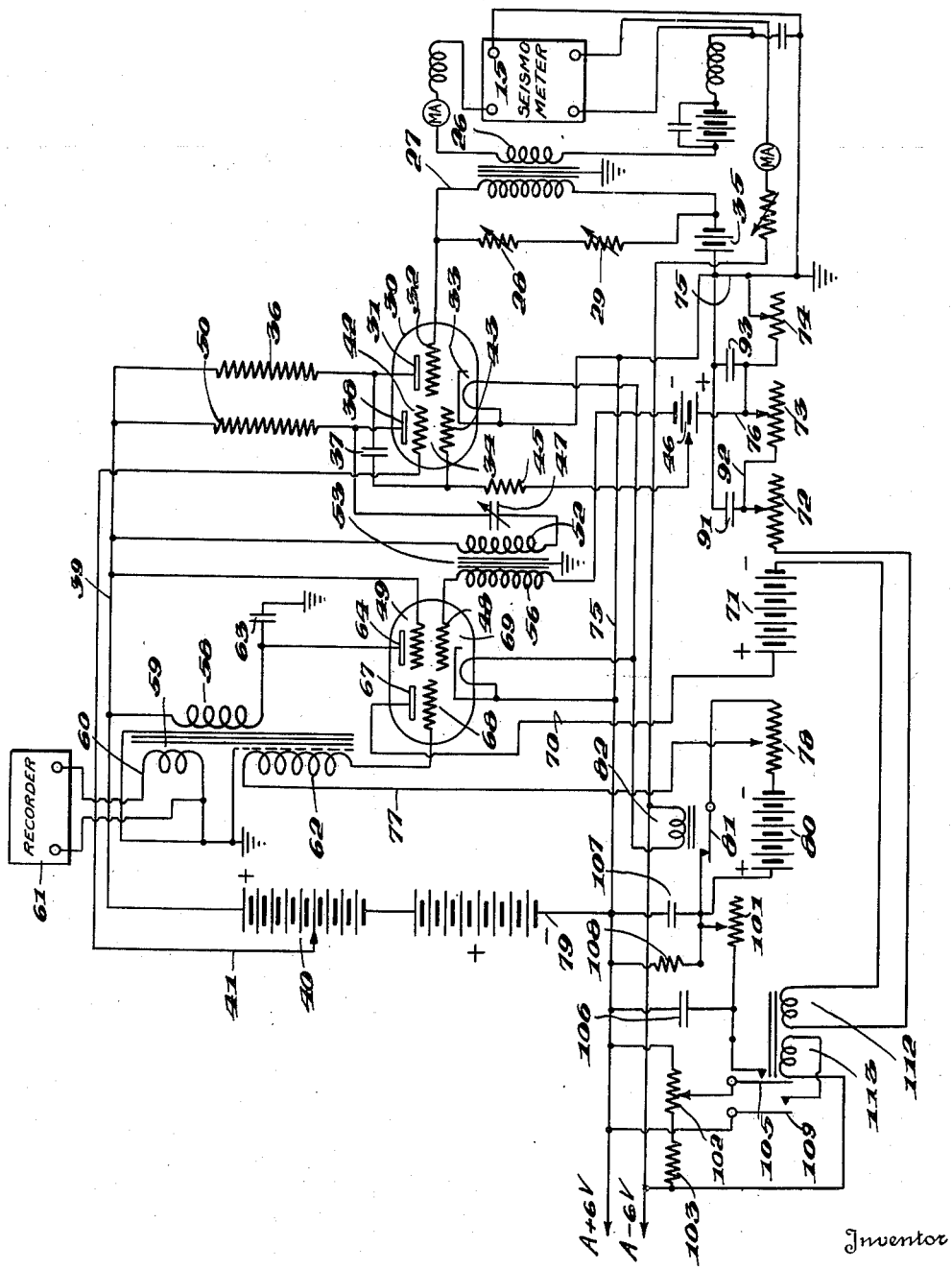

2,352,494

UNITED STATES PATENT OFFICE 2,352,494

SEISMIC SURVEYING

Josephus O. Parr, Jr., San Antonio, Tex., assignor to Olive S. Petty, San Antonio, Tex.

Application July 21, 1942, Serial No. 451,779

4 Claims. (Cl. 177—352)

This invention relates to methods of and apparatus for conducting seismic surveys for use in connection with geophysical prospecting, and more particularly to apparatus and methods for recording the seismic wave trains as they arrive at one or more reception points.

It is a general object of the present invention to provide novel and improved apparatus for and methods of recording the arrival times of waves which are received over a period of several seconds and exhibit during that time various intensities or amplitudes, the ratio of the highest to the lowest amplitude being relatively large.

Thus it is well recognized that certain higher energy waves may be received with an intensity of the order of 600 times as great as certain other waves, and it is also noted that during a period following the reception of waves of high amplitude, the wave form energy is gradually attenuated over an appreciable period, usually decaying rather uniformly with time. Thus in order that waves of widely varying amplitude may all be received and recorded by sensitive apparatus on a record sheet or other medium of convenient dimensions, it is highly essential that some means be provided to bring the waves, or the energy derived therefrom, to levels not greatly differing throughout the total time of wave reception.

It has been proposed heretofore to provide seismic apparatus with means functioning automatically to regulate and control the amplitude of the recorded signal for the purpose of compensating, at least in part, for the wide variation in amplitude of the seismic wave trains. One such arrangement is described in the application for U. S. Letters Patent by Olive S. Petty, Serial No. 290,928, filed August 18, 1939. Thus that application discloses, in association with a seismometer or other device for converting seismic impulses into electrical wave form signal energy, an amplifier for such signal energy, the degree of amplification effected in such amplifier being automatically regulated in response to change in amplitude of the seismic waves. In automatic volume controls of this character it is a common expedient to provide means whereby control is not effected unless and until the amplitude of the incoming signal exceeds a predetermined value, commonly called "the threshold value," and in said prior application this threshold value is substantially constant during the taking of a record.

I have found, however, that it is highly advantageous to amplify the incoming signals to a greater extent toward the end of the record than in the earlier part of the record, and while the circuit disclosed in said prior application will function satisfactorily for this purpose in the event the threshold value is exceeded and the automatic volume control caused to function only once during the taking of the record, namely during the arrival of the early high energy waves, subsequent arrival of signals exceeding the threshold value in amplitude and causing repeated functioning of the A. V. C., nullifies to a large extent the effect of the circuit in affording gradually increasing sensitivity with time.

In accordance with the instant invention it is therefore proposed to vary the threshold value during the taking of a record, for example by effecting a gradual increase of this value with time, so that toward the end of the record the A. V. C. will be caused to function only on the arrival of seismic waves of substantially increased amplitude.

The desirability of increasing the amplification factor or sensitivity of the amplifier toward the end of the record is particularly important because, in general, seismic waves reflected from deeper beds tend to be lower in frequency as well as in amplitude. Thus in the early portion of the record, the high frequencies predominate, and since the peaks of separate cycles on the recorded traces are quite close together, increase in amplification makes it difficult to determine the precise instant of arrival of the waves reflected from a given bed, especially if the amplification is sufficient to cause overlapping of adjacent record traces. Toward the end of the record, however, where the peaks are fairly widely separated, increased amplification renders the arrival times much more readily apparent. Again, the step-out or displacement from one recorded trace to the next, assuming that the dip of the deeper beds is the same as that of the shallow beds, is much less toward the end of the record, and overlapping of adjacent traces is not likely to be confusing. Consequently, an amplitude toward the end of the record of two or three times that at the first portion of the record can be employed without any apparent crowding of the record and with a substantial improvement in interpretive clarity.

It is therefore an object of the invention to provide, in an A. V. C. circuit for amplification of seismic energy, means whereby substantially greater amplification toward the end of the record than at the earlier part of the record occurs, regardless of the repeated arrival of impulses of substantial amplitude. More specifically, it is the object of the invention to provide, in apparatus of the character described, an automatic volume control in which the threshold value for its operation is gradually increased with time, preferably beginning with the time of arrival of the first high energy waves.

Further objects and features of the invention will be apparent from the following description taken in connection with the accompanying drawing, in which the single figure is a circuit diagram of an amplifier for wave-form electrical signals illustrating one method of applying the instant invention.

In order to facilitate an understanding of the invention, reference will be made to the embodiment thereof illustrated in the accompanying drawing and specific language will be employed. It will nevertheless be understood that various further modifications of the apparatus illustrated herein, such as would fall within the province of those skilled in the art to construct, are contemplated as part of the present invention.

Referring now to the drawing for a better understanding of an actual embodiment of the invention, there is shown in Figure 1 a detector or seismometer 15 of any suitable type adapted to convert seismic energy to wave form electrical signals. These signals are fed into a suitable output circuit which includes the primary 26 of a transformer, the secondary 27 of which is shunted by a pair of variable resistors 28 and 29, one for coarse and one for fine adjustment, for manually setting the level of the signal applied to the amplifier.

The secondary 27 feeds into the cathode and grid of the thermionic valve 30 which constitutes a simple triode amplifier having the anode 31, grid 32, and heated cathode 33 which it shares in common with the elements of the second stage amplifier valve indicated at 34. A suitable biasing battery 35 is arranged in the grid circuit of the triode amplifier. This amplifier is coupled to the second stage amplifier by means of an anode coupling resistor 36 and condenser 37. The anode 31 as well as the anode 38 of the second stage valve receive their voltage supply through the common conductor 39 connected to the positive end of the battery 40. A tap 41 in this battery supplies the screen grid 42 of the second stage amplifier with a somewhat lower potential, permitting more gain and improved automatic volume control. The control grid 43 of the second stage amplifier is coupled by the condenser 37 to the anode of the first stage and receives its bias through resistor 45 from a tap on battery 46. An adjustable coupling condenser 47 and anode resistor 50 provide the coupling between the second stage anode 38 and the control grid 48 of the third stage amplifier valve 49. Condenser 47 acts in the nature of a filter, first to avoid flow of anode current through the primary winding 52 of the interstage coupling transformer 53, thus increasing the transformer life and permitting its design to be more efficient, and second, to vary the frequency response of the amplifier, giving it the highest gain on the desired frequencies and very low gain on undesired frequencies, which effect comes from resonating the transformer primary.

The secondary winding 56 of the interstage transformer 53 connects between the control grid 48 and the bias battery 46. The output from the third stage is fed through the primary 58 of transformer 59, one secondary 60 of which delivers the amplified waves to the moving element of a galvanometer associated with and forming part of a recorder 61. Another secondary 62 takes off a portion of the output of the amplifier for supply to the automatic volume control valve as will be further described hereinafter. The condenser 63 between the anode 64 of the third stage valve and ground serves to by-pass high frequencies and to resonate the output transformer to assist in the desired filter action. At the same time, this condenser performs the important function of assisting in the damping of the moving element of the galvanometer.

In the same envelope with valve 49 is a triode, which may for convenience be referred to as the A. V. C. valve, comprising anode 67, grid 68, and the common heated cathode 69 which functions also with the elements of the third stage amplifier. The anode 67 is connected by wire 70 to a separate source 71 of anode voltage, the negative pole of which leads through variable resistors 72, 73, and 74 back to wire 75 connected to the negative end of the source of heater current and common ground terminal. It will be noted that bias battery 46 is connected by wire 76 to the slider of the resistor 73 and hence is also connected to the ground through resistor 74 which is arranged in shunt with condenser 93. The battery 71 may have a potential of about 45 volts for the type of valve shown, while the value of resistors 72, 73, and 74 may be of the order of 200,000 ohms each. A condenser 91 is connected across resistors 73 and 74 to ground.

The grid 68 of the A. V. C. valve is fed from the secondary 62 of the output transformer 59, the opposite end of which is connected by conductor 77 to the slider of a potentiometer 78 energized from battery 80, through the contacts 81 of a relay, the winding 82 of which is in series with the heaters of valves 30 and 49, the positive terminal of battery being returned to the cathode of the A. V. C. valve through resistor 108.

The slider on the potentiometer 78 is set to supply a sufficiently negative bias to the control grid 68 of the A. V. C. valve to normally prevent the flow of any anode current in that valve. Preferably the valve is thus biased substantially beyond cut-off, and flow of anode current occurs only during positive swings of the output signal of sufficient magnitude to drive the grid across the cut-off point toward the positive side. Thus whenever the positive potential supplied from the transformer winding 62 becomes sufficiently high, the grid will permit the flow of current to anode 67.

It will be seen that when no current is flowing in the anode circuit of the A. V. C. valve, the positive pole of battery 46 is substantially at ground potential. The bias on grids 43 and 48 of the second and third stage amplifier valves is therefore determined by the potential of the battery 46 and the gain of the amplifier is fixed thereby. However, when current flows in the anode circuit of the A. V. C. valve through the resistors 72, 73 and 74, the potential of the conductor 76 becomes negative with respect to ground by an amount corresponding to the voltage drop across the resistor 74, and the bias on the grids 43 and 48 is thereby rendered more negative to reduce the gain of the amplifier.

Condensers 91 and 93 are of relatively large capacity, for example of the order of one microfarad, and in conjunction with resistances 72 and 73, constitute a time delay circuit preventing immediate reduction of sensitivity in the amplifier on the arrival of a single impulse of large amplitude, the negative bias on the amplifier valves gradually increasing during the arrival of several successive impulses of high amplitude while the condensers 91 and 93 are being charged, so that noticeable distortion is avoided. Again, these condensers hold the charge thereby imparted to them for a considerable period of time, the rate of discharge being determined by the setting of the resistors 73 and 74.

Thus on the arrival of the earlier waves of excessively large amplitude, the grid 68 of the A. V. C. valve is driven sufficiently positive by the signal energy derived from the output transformer secondary 62 to cause a flow of current to the anode 67, thereby charging the condensers 91 and 93 and applying a more negative bias to the grids 43 and 48 of the amplifier valves to reduce the gain of the amplifier. The setting of the resistor 78 determining the bias on the A. V. C. valve should be such that each of the swings of the signals derived from these excessively large waves causes the A. V. C. valve to function and therefore the charging of condensers 91 and 93 continues until such waves have passed. The first of the reflected waves may be normally too small to cause functioning of the A. V. C. valve but the gain of the amplifier does not immediately return to normal since the charge on condensers 91 and 93 leaks off slowly and hence the bias on the amplifier grids 43 and 48 becomes more positive gradually. The time required for this charge to leak off can be set by appropriate adjustment of resistor 74 to extend substantially for the time during which it is desired to record the reflected waves, or preferably for a lesser time in order to ensure adequate amplification throughout the record, the gain slowly increasing as the strength of the waves is reduced because of the lowering voltage on 91, producing a chart of reasonably uniform character. In the event of arrival during this period of waves sufficiently large to again render the A. V. C. valve operative, the charging of condensers 91 and 93 is repeated.

In the prior filed application Serial No. 290,928, hereinbefore mentioned, the threshold value above which the A. V. C. is caused to function remains constant during the taking of a record. Consequently, on each occurrence of the arrival of seismic waves of sufficient amplitude, the sensitivity of the amplifying system is momentarily reduced, with the result that substantially increased amplification toward the end of the record, which is desirable for reasons hereinbefore pointed out and which would normally occur in the absence of later arriving waves of high amplitude, is prevented by the repeated charging of condensers 91 and 93. I accordingly prefer to provide means, of which one form will now be described, affording a gradual increase of the threshold value with time, so that the amplitude of signals required to cause the A. V. C. to function is substantially larger toward the end of the record than nearer the beginning of the record.

Thus I may introduce a condenser 107, in shunt with resistor 108, between the positive terminal of the battery 80 and the ground, in combination with means for gradually charging the condenser 107 during the taking of a record, whereby the condenser charge is added to the voltage drop across resistor 78 in such manner as to render more negative the bias applied to grid 68 of the A. V. C valve. For this purpose I have shown a condenser 106, connected in series with variable resistor 101 across condenser 107, the arrangement being therefore such that any voltage impressed on condenser 106 will gradually be applied to condenser 107 through resistor 101.

In order to charge the condenser 106, which is of relatively small value, I may provide resistors 102 and 103 which are arranged in series across the source of cathode voltage for the amplifier valves. A slider on resistor 102 is selectively connected through a relay switch 105 to that side of condenser 106 remote from the ground, the relay being actuated to close the switch in the first instance by a winding 112 which is energized by current flowing from the anode 67 of the A. V. C. valve, the switch being thereafter retained in closed position by a winding 113 which is energized on closing of switch 109, the latter being similarly closed initially by energization of winding 112. Resistor 108 may be given a sufficiently high value to prevent rapid drainage of the charge impressed on condensers 106 and 107.

It will be appreciated that on the occurrence of a signal in excess of the threshold value, resulting in operation of the A. V. C. valve, and resultant charging of condensers 91 and 93 as hereinbefore explained, the relay switch 105 will be operated by energization of the winding 112, and the switch will thereafter be retained in closed position by the resultant energization of winding 113. On the closing of the switch 105, the voltage drop across part of the resistor 102 is applied to charge the condenser 106, and the charge gradually leaks off through resistance 101 to the condenser 107, with the result that the bias voltage applied to the grid 68 by the source 80 is gradually increased in a negative direction as the charge on condenser 107 increases. In other words, beginning with the instant of first operation of the A. V. C. circuit, the threshold value of the A. V. C. valve steadily increases toward the end of the record or until the condenser 107 acquires the potential of the condenser 106, the charging period for condenser 107 being controlled by adjustment of resistor 101, and the ultimate voltage impressed thereon being regulated by adjustment of resistor 102. Consequently, any succeeding operation of the A. V. C. circuit as the result of repeated arrival of high energy waves must be caused by waves of greater intensity than those required to effect initial operation of the A. V. C., with the result that the sensitivity of the amplifier in the taking of any given record is generally substantially higher toward the end of the record than if the circuit disclosed in the aforesaid application of Olive S. Petty, having a constant threshold value, were employed.

It will be appreciated that the desired variation in sensitivity of the amplifier with time may be initiated at some other point in the taking of the record. For example, instead of connecting the winding 112 in the anode circuit of the A. V. C. valve, I may connect the terminals of the winding in shunt or in series with that movable element of the galvanometer which is supplied with current on the firing of the charge, for example by means of the circuit shown in my prior application, Serial No. 326,947, filed March 30, 1940, which has ripened into Patent No. 2,331,623, dated October 12, 1943. In this manner the bias on the grid 68 may be increased beginning with the instant of the cap break. Arrangements for effecting energization of winding 112 at other desired times during the taking of a record may readily be supplied by one skilled in the art.

It will be understood that in a multiple system employing a plurality of seismometers and associated amplifying units with a multiple oscillagraph, the grid bias varying means illustrated herein need not be duplicated in each amplifier since the charge applied to condenser 107 of one amplifier unit may be used to vary the grid bias of the amplifier valves in the other amplifying units of the series, with resulting simplification in the circuits of such units.

Having thus described the invention, what is claimed as new and desired to be secured by Letters Patent is:

1. An amplifying system for amplifying a train of waves extending over a period of several seconds and in which the first part of the train has a general amplitude level several times greater than that of the remainder and in which the general level of the remainder gradually decreases, the combination with a seismometer for converting incoming seismic energy into electrical wave form signals, and means for amplifying and recording such signals, said amplifying means including at least one thermionic valve amplifier, of a thermionic control valve for applying to a control grid of said valve amplifier a more negative bias in response to increase in amplitude of incoming energy above a predetermined amplitude, means normally biasing the grid of said control valve beyond cut-off, means applying to the grid of said control valve a bias derived from the incoming energy of such value as to render the grid potential less negative than said normal bias when said energy exceeds said predetermined amplitude, and means automatically operable before the major portion of the wave train has been received to gradually render said normal bias more negative toward the end of the period of arrival of the train to effect a corresponding increase in said predetermined amplitude independent of subsequent incoming energy, said last named means acting over the major portion of the period of arrival of the train.

2. An amplifying system for amplifying a train of waves extending over a period of several seconds and in which the first part of the train has a general amplitude level several times greater than that of the remainder and in which the general level of the remainder gradually decreases, the combination with a seismometer for converting incoming seismic energy into electrical wave form signals, and means for amplifying and recording such signals, said amplifying means including at least one thermionic valve amplifier, of a thermionic control valve for applying to a control grid of said valve amplifier a more negative bias in response to increase in amplitude of incoming energy above a predetermined amplitude, means normally biasing the grid of said control valve beyond cut-off, means applying to the grid of said control valve a bias derived from the incoming energy of such value as to render the grid potential less negative than said normal bias when said energy exceeds said predetermined amplitude, and means automatically operable in response to the reception of such energy in excess of said predetermined amplitude to gradually render said normal bias more negative toward the end of the period of arrival of the train to effect a corresponding increase in said predetermined amplitude independent of subsequent incoming energy, said last named means acting over the major portion of the period of arrival of the train.

3. An amplifying system for amplifying a train of waves extending over a period of several seconds and in which the first part of the train has a general amplitude level several times greater than that of the remainder and in which the general level of the remainder gradually decreases, the combination with a seismometer for converting incoming seismic energy into electrical wave form signals, and means for amplifying and recording such signals, said amplifying means including at least one thermionic valve amplifier, of a thermionic control valve for applying to a control grid of said valve amplifier a more negative bias in response to increase in amplitude of incoming energy above a predetermined amplitude, means normally biasing the grid of said control valve beyond cut-off, means applying to the grid of said control valve a bias derived from the incoming energy of such value as to render the grid potential less negative than said normal bias when said energy exceeds said predetermined amplitude, and means automatically operable in response to the reception of such energy in excess of said predetermined amplitude to gradually render said normal bias more negative toward the end of the period of arrival of the train to effect a corresponding increase in said predetermined amplitude independent of subsequent incoming energy, said last named means acting over the major portion of the period of arrival of the train and including a condenser, devices operatively connected to effect gradual charging of said condenser beginning with the reception of energy in excess of said predetermined amplitude, and connections between said condenser and the grid of said control valve for applying the condenser charge to the latter so as to vary with time, and in a negative direction, the normal bias on said control valve.

4. An amplifying system for amplifying a train of waves extending over a period of several seconds and in which the first part of the train has a general amplitude level several times greater than that of the remainder and in which the general level of the remainder gradually decreases, the combination with a seismometer for converting incoming seismic energy into electrical wave form signals, and means for amplifying and recording such signals, said amplifying means including at least one thermionic valve amplifier, of a thermionic control valve for applying to a control grid of said valve amplifier a more negative bias in response to increase in amplitude of incoming energy above a predetermined amplitude, means normally biasing the grid of said control valve beyond cut-off, means applying to the grid of said control valve a bias derived from the incoming energy of such value as to render the grid potential less negative than said normal bias when said energy exceeds said predetermined amplitude, and means automatically operable before the major portion of the wave train has been received to gradually render said normal bias more negative toward the end of the period of arrival of the train to effect a corresponding increase in said predetermined amplitude independent of subsequent incoming energy, said last named means acting over the major portion of the period of arrival of the train, and including a source of potential, a condenser, connections between said source and said condenser operable to effect gradual charging of said condenser by said source, and connections between said condenser and the grid of said control valve for applying the condenser charge to the latter so as to vary with time, and in a negative direction, the normal bias on said control valve.

JOSEPHUS O. PARR, Jr.